US006437012B1

(12) United States Patent
Wang

(10) Patent No.: US 6,437,012 B1
(45) Date of Patent: Aug. 20, 2002

(54) LOW-SWELLING, MACROPOROUS POLYMER-SUPPORTED REAGENTS FOR ORGANIC SYNTHESIS AND PURIFICATION

(75) Inventor: Qunjie Wang, Hockessin, DE (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/428,162

(22) Filed: Oct. 27, 1999

(51) Int. Cl.$^7$ ............................... C08F 8/34; C08F 8/32

(52) U.S. Cl. ..................... 521/32; 525/332.2; 525/350; 525/377; 525/379; 525/382

(58) Field of Search .......................... 521/32; 525/332.2

(56) References Cited

U.S. PATENT DOCUMENTS

| | | | |
|---|---|---|---|
| 4,874,518 A | 10/1989 | Kirkland et al. | 210/502.1 |
| 5,032,266 A | 7/1991 | Kirkland et al. | 210/198.2 |
| 5,087,671 A | 2/1992 | Loeppky et al. | 525/328.2 |
| 5,108,595 A | 4/1992 | Kirkland et al. | 210/198.2 |
| 5,230,806 A | 7/1993 | Fritz et al. | 210/692 |
| 5,244,582 A | 9/1993 | Loeppky et al. | 210/757 |

FOREIGN PATENT DOCUMENTS

| | | |
|---|---|---|
| EP | 0 816 309 A1 | 1/1998 |
| EP | 0 818 431 A1 | 1/1998 |
| EP | 0 825 164 A2 | 2/1998 |

OTHER PUBLICATIONS

"Synthesis of Functional Monomers by Vinylbenzylation and Polymerization of These Monomers", Asami et al, Jpn.–USSR Polym. Symp., [Proc.], 2$^{nd}$ (1976), pp. 249–259.*

*Tetrahedron Letters*, vol. 38, No. 19, pp. 3357–3360 (1997) "Rapid Purification of Small Molecule Libraries by Ion Exchange Chromatography", Siegel, et al.

*Journal of the American Chemical Society* 97:15, Jul. 23, 1975, "Probes for the Study of Acylation Reactions", J. Rebek, et al.

\* cited by examiner

*Primary Examiner*—Bernard Lipman

(57) ABSTRACT

A low-swelling, highly crosslinked, macroporous polystyrene resin containing functional groups which are capable of selectively binding to reaction impurities, such as excess reactant or reaction by-products, which are contained in a reaction medium. The reaction impurities can thereby be efficiently removed from the reaction medium, providing a convenient method for product purification.

20 Claims, No Drawings

LOW-SWELLING, MACROPOROUS POLYMER-SUPPORTED REAGENTS FOR ORGANIC SYNTHESIS AND PURIFICATION

BACKGROUND OF THE INVENTION

This invention relates to the use of low-swelling, highly crosslinked, macroporous styrene polymers as scavengers for removing unreacted compounds and side products from a reaction medium. The styrene polymers of this invention can be functionalized with one or more groups which are designed to be reactive with functional groups contained on the compounds to be removed form the reaction mixture. Typically, such functional groups include isocyanate groups, thiol groups, aldehyde groups, amino groups, and hydrazine groups. The styrene polymers of this invention can be used in purification schemes involving the high throughput parallel synthesis of combinatorial chemical libraries of potential lead drug compounds.

Parallel synthesis, as referred to herein, describes a technology for high throughput organic synthesis characterized by the preparation of a large number of compounds simultaneously and discretely (in parallel). Parallel synthesis generally involves the use of a large number of reaction vessels, such as an array of multi-well plates, which may contain different combinations of a number of reactants of interest. The reactions are allowed to proceed simultaneously and in parallel in each vessel to produce a diverse collection or library of product molecules. The individual compounds in the library can be screened against a suitable target to determine the probability of biological activity. Automation of synthesis and screening procedures is desired to provide high throughput operation using mechanical devices, such as laboratory robots. In this way, many thousands of compounds can be prepared and screened in a relatively short time.

One of the bottlenecks in automated processes such as these is product purification. Ideally, these reactions proceed to completion, and only a single reaction product will be generated in each reaction vessel. However, in many instances the reaction medium may contain unreacted reactants and/or reaction by-products as impurities after a reaction has occurred. These substances represent impurities which must be efficiently removed from the reaction mixture as part of the purification procedure to obtain the desired product. Traditionally, the purification can be accomplished by chromatographic separation, using plain silica or reverse phase silica, such as $C_{18}$ modified silica, as a stationary phase. The traditional chromatographic separation is both time and labor intensive, and cannot be run in parallel for a relatively large number of compounds.

Two purification strategies have generally been adapted for high throughput parallel synthesis: a solid phase synthesis; and a solid reagent assisted solution phase synthesis, including the use of soluble polymer reagents that can be precipitated out of the reaction mixture by solvent switching.

In solid phase synthesis, a reactant is first linked with a cleavable linkage to a solid support. The subsequent reaction of the support-anchored reactant with another reactant in solution produces an expected chemical identity anchored to the support. A selective cleavage releases the expected compound from the solid support with relatively high purity. Unreacted reactants and by-products are easily removed from products anchored to the support by washing or filtering the support after the reaction. However, the majority of the well-documented organic reactions is performed in solution phase, and many of these reactions cannot be carried out using a solid phase synthesis without substantial changes to the reaction procedure, if at all. Other drawbacks of solid phase synthesis include the required tolerance of the linker towards the reaction mixture, the required tolerance of the linker against premature cleavage, unnecessary by-products generated from the cleavage reaction, and the presence of trace of the linker in the final product.

The other approach, solid-reagent assisted solution phase synthesis, involves the use of solid-phase reagents, either participating in the synthesis reactions, or removing excess reactants and by-products from the reaction mixture. In the former case, the solid-support reagents, often termed "solid reagents", are a part of the organic synthesis reaction, and this approach differs from solid phase synthesis by forming and removing by-products in solid form, leaving desired compounds in the solution. In the latter case, the solid-supported reagents, often termed "scavengers", are not part of the synthesis reactions, and are applied to selectively remove excess reactants and/or by-products in the reaction mixture by ion-pairing or covalent bonding these impurities, leaving the desired compounds in the solution.

The concept and practice of "scavenging", referring to the selective removal of organic compounds from solution by binding them onto a solid surface, is known in the art. As an example, U.S. Pat. No. 3,576,870 describes the purification of N, N-dimethylacetamide by removing excess acetic anhydride with a basic ion exchange resin. It is also known in the art that organic compounds can be selectively scavenged by covalently bonding them onto a solid surface. Examples of such types of "scavenging" are found in U.S. Pat. Nos. 5,087,671 and 5,244,582, which describe the use of various reactive groups immobilized on inorganic substrates to remove carcinogenic nitrosating agents from liquids. Another example, published in J. Am. Chem. Soc., 97, page 4407 (1975), shows the use of an amine bound to a lightly cross-linked polystyrene gel for removing organic anhydrides from an organic solution. While the application of "scavengers" in organic parallel synthesis reactions is relatively new, there have been many recent publications directed to this emerging technology. U.S. Pat. No. 5,767, 238 describes the general application of functionalized solid particles for removing impurities in a so-called "inverse solid-phase synthesis" process by either ionic or covalent binding. Scavenger-assisted combinatorial libraries are described in the following European patent publications: EP 816309, for preparing ureas or thioureas; EP 818431, for scavenging secondary amines; EP 825164, for scavenging amides, carbamates and sulfonamides. The scavengers used include amines, isocyantes, and acid chloride functionalities bound to certain polymers and inorganic substrates.

Many functionalized polymer-based particles have been used as scavenger materials, and some commonly used scavengers, based on lightly cross-linked (1% or 2%) polystyrene/divinylbenzene particles, are commercially available from several sources (e.g. Novabiochem, Laufelfingen, Switzerland). However, most of the polymer-based scavengers in the prior art are based on lightly cross-linked (1% or 2%) polystyrene/divinylbenzene, particularly for covalent-bonding scavengers. These materials have some distinct disadvantages. First, these materials can be used only with solvents that produce significant amounts of swelling, such as THF and methylene chloride, which allow accessibility of the functional sites to reactants in solution. Many common solvents, such as methanol and acetonitrile, may result in poor scavenging performance of the materials due to insufficient swelling. Second, using those compatible solvents, the materials may swell greatly, e.g. up to 5–10 fold of the original volume of the dry polymers. The high degree of swelling limits the amount of scavengers which can be put in a small vessel, such as 96 well microtiters which are commonly used in high throughput parallel synthesis reactions. Due to the large volume of absorbed solvent, the amount of solvent required for rinsing the particles must be high, raising concerns over volume constraints of collectors and processing equipment. The swelling also makes the materials unsuitable for being pre-packed in certain desired formats, such as columns, membranes or cartridges.

Although highly cross-linked porous polymer materials have long been used for ion-exchange, catalysis and organic absorption, the application of these materials in organic synthesis was not extensively explored until recently. A few examples given below show the application of such highly cross-linked porous polymers for ion-exchange, solid phase extraction, column chromatography, and solid phase synthesis. U.S. Pat. No. 5,230,806 describes the use of functionalized polystyrene-divinylbenzene adsorbent resins in solid-phase extraction. In particular, the reference describes the use of polystyrene-divinylbenzene resins containing such functionality as hydroxymethyl, acetyl or cyanomethyl groups for removing phenols from aqueous solutions by adsorption with minimal selectivity. U.S. Pat. No. 4,871,824 describes azlactone-functional polymer beads which can be used as complexing agents and chromatographic support materials.

In U.S. Pat. No. 5,656,707, new highly cross-linked polymer materials are disclosed. In one embodiment, the highly crosslinked polymer can be prepared from a styrene monomer and an acrylic cross-linking agent. The materials are characterized by their good mechanical stability, due to their high degree of crosslinking, and relatively higher swelling, due to the cross-linking structure. These properties are particularly desirable when the polymers are used for solid phase synthesis. Some macroporous polymer resins are also commercially available for solid phase synthesis (e.g., Argonaut Technologies, San Carlos, Calif.).

Despite the many applications for macroporous polymers which have developed in a number of areas, the use of functionalized macroporous polymer materials as scavengers in solution phase parallel synthesis has not been well explored. Only a few commercial macroreticular polymer ion-exchange resins (e.g. Amberlites) have been used to remove amines or acids by ion-pairing. It would be desirable to overcome the difficulties in scavenging processes related to the high swelling and narrow solvent compatibility of current polymer scavengers, by developing and using functionalized highly cross-linked, macroporous polymer materials with specific functionality.

It will be readily appreciated that a need exists for improved scavenging reagents which have a relatively low degree of swellability while maintaining the capacity, reactivity and broad solvent compatibility desired in these applications. Such materials would be particularly useful in high throughput synthesis reactions, particularly in easy use formats such as columns, membranes, beds and cartridges.

SUMMARY OF THE INVENTION

The present invention features a scavenging reagent for use in chemical synthesis procedures, devices incorporating such reagents, and methods for using the reagent in such procedures. The scavenging reagent comprises a low-swelling, highly crosslinked, macroporous polymers, and preferably polystyrene resins, which contain functional groups designed to bind to, and remove impurities from, reaction mixtures containing products of interest. The products of interest can result from the combinatorial chemical synthesis of a large number of compounds in a chemical library. These chemical entities are purified using high speed techniques.

In one aspect, the polymers of this invention are highly crosslinked, low-swelling macroporous resins. The resins contain at least 8% mole of cross-linking agent, compared to the 1% or 2% crosslinking generally used for polystyrene divinylbenzene polymers. The highly crosslinked structures typically result in a polymer which swells less than about 100% in THF or dichloromethane, compared to 500% to 1000% swelling for 1% or 2% crosslinked polymers. The low degree of swelling produces a polymer reagent having a much higher scavenging capacity within a limited volume when used to remove compounds of interest from organic solutions. The broader solvent compatability results from the porous structure of the polymer. The porous characteristics of the polymer eliminate polymer swelling to permit the compounds to be scavenged to gain access to the functional sites of the polymer.

In another aspect, the polymers of this invention are macroporous and have a porosity ranging from about 0.15 cc/g to about 1.5 cc/g, with an average pore size of at least about 30 Å. The diameter of the polymer particles is preferably between about 10 microns and about 400 microns. This gives good reaction kinetics while also permitting a reasonable flow rate of reaction solution when using vacuum filtration.

In yet another aspect, the preferred polymers of this invention are macroporous polystyrene divinylbenzene polymers, and derivatives thereof, such as chloromethylated-polystyrene divinylbenzene and aminomethylated-polystyrene divinylbenzene polymers having specific surface areas of from about 15 $M^2/g$ to about 600 $M^2/g$. However, many other low-swelling, highly crosslinked polymers are also suitable for the practice of this invention, so long as they function to selectively remove impurities from reaction mixtures without interfering with the reaction. These polymers, in general, can be copolymers of styrene or substituted styrenes, such as chlorostyrene, methyl styrene, chloromethyl styrene, aminomethyl styrene, and the like, cross-linked with a suitable cross-linker, such as an organic molecule having at least two vinyl groups that may be co-polymerized with styrene monomers, such as (but not exclusively) divinylbenzenes, triallyl isocyanurate, ethylene dimethacrylate, and the like. Such polymers are available from a number of commercial suppliers, such as the Rohm & Haas Company.

Polymer reagents, or scavenging reagents, having different functional groups are preferably prepared by functionalizing the low-swelling, highly crosslinked macroporous polymers described herein. Alternatively, the polymers of this invention can also be prepared by co-polymerizing functional monomers with other suitable monomers and/or crosslinking agents in appropriate amounts.

The functional groups impart the desired binding sites to the polystyrene to enable the selective removal of the impurities from the reaction mixture. This makes the polymers particularly useful as scavengers since these groups selectively bind to the impurities in the reaction mixture in an irreversible manner, permitting the scavenger to efficiently remove the impurities from the reaction mixture. Functional groups of particular interest include, by way of example, the following: —CH$_2$NCO, —CH$_2$NHCONArNCO (wherein Ar is phenylene or methyl phenylene), —CH$_2$SH, —CHO, —CH$_2$NHCH$_2$CH$_2$N (CH$_2$CH$_2$NH$_2$)$_2$, —CH$_2$NHCH$_2$CH$_2$NH$_2$, —CH$_2$O—Ar—CHO (wherein Ar is 1,4 phenylene), —CH$_2$N(R$^1$)R$^2$ (wherein R$^1$ and R$^2$ are ethyl, isopropyl or n-propyl), -piperidinomethyl, and -morpholinomethyl. The type of functionality encompassed by these specific compounds includes the broad classes of isocyanate, thiol, aldehyde, and amino groups.

In one embodiment, the particulate polymer reagents of this invention can be embedded in a macroporous sheet or film, such as, for example, a porous film through which a reaction mixture passes. In this embodiment, the film can be part of a larger structure which is also porous and is used to support the film. The reaction mixture is caused to flow through the film and the impurities adhere to the film, while the reaction mixture containing essentially only the product is collected. The impurities can be removed from the resin by washing the film.

In another embodiment, the polystyrene can be used in the form of macroporous beads or particles. Preferably, the particles will be present in a device for removing impurities from a reaction mixture. The device can comprise a chromatographic column, a bed, or a cartridge packed with the functionalized, highly crosslinked, macroporous polystyrene particles. The reaction mixture can be passed through the column or cartridge in a continuous flow procedure for maximum speed and efficiency.

It has now surprisingly been found that a low-swelling, highly crosslinked macroporous polystyrene resin can have sufficiently low swelling in organic solvents so as to be capable of being used in a cartridge or bed format, while also possessing excellent liquid diffusion within the macroporous structure to permit the binding of impurities, such as unreacted reactants, to the substrate.

DETAILED DESCRIPTION

The low-swelling, highly crosslinked, macroporous polymers of the present invention can be prepared by a variety of techniques which are well known in the art. In general, a styrene monomer is polymerized with a suitable crosslinking agent in a solvent under polymerization conditions which are well established in the art. Typical reaction conditions, solvents and catalysts can be found in many publications, such as U.S. Pat. No. 5,656,707, the pertinent disclosure of which is incorporated herein by reference. Suitable resins are available commercially from a variety of sources, including the Hecheng Science and Technology Development Co. (China).

Crosslinking agents which can be used to crosslink the polystyrene resin include divinylbenzene, acrylates, multiolefinic monomers, and the like. Sufficient crosslinking agent, e.g. 8% mole or more, is used in the polymerization reaction to obtain a high level of crosslinking.

The polystyrene resin of this invention is primarily used as scavenger to remove reaction impurities from a reaction mixture. The impurities may include excess reactants, reaction by-products, or catalysts. The reaction impurities are removed from the reaction mixture by selectively binding to a reactive or functional site on the polystyrene resin. For example, primary or secondary amines may be removed by selectively binding to an isocyanate-modified polymer in the presence of amides or tertiary amines.

The functional groups are introduced into the polystyrene resin by reacting the resin with a reagent containing at least one functional group. Alternatively, the monomeric units comprising the resin, or the crosslinking agent, can be reacted with the reagent containing the functional groups, and the polymeric constituents can be subsequently polymerized using conditions as described previously.

Reagents containing functional groups which are suitable for use in this invention include, by way of example, low-swelling, porous polystyrene divinylbenzene which is chloromethylated with chloromethylethylether, and subsequently transformed into polymer-bound functionality's.

Suitable funtionalized polymers with functional amines include MP—CH$_2$NHCH$_2$CH$_2$NH$_2$, MP—CH$_2$NHCH$_2$CH$_2$N(CH$_2$CH$_2$NH$_2$)$_2$, MP—CH$_2$N(R$^1$)R$^2$ (wherein R$^1$ and R$^2$ are ethyl, isopropyl or n-propyl) CH$_2$NHCH$_2$CH$_2$NH$_2$, MP-piperidinomethyl, and MP-morpholinomethyl, using corresponding amines such as ethylene diamine, trisaminoethylamine, diethylamine, diisolpropylamine, dipropylamine, piperidine, and morpholine. In the above polymers, and those described below, the designation "MP" refers to a low-swelling, porous polymer, and preferably a polystyrene divinlybenzene copolymer. Other suitable functionalized polymers are described below. However, it will be readily appreciate by those skilled in the art that a variety of other functional groups can be appended to a low-swelling polymer, and that the particular functionalized polymers described below can be made in a variety of ways by those skilled in the art.

MP—CHO, which can be prepared by oxidizing MP—CH$_2$Cl with DMSO in the presence of a strong base, such as potassium bicarbonate.

MP—CH$_2$O—Ar—CHO (wherein Ar is 1,4 phenylene), which can be prepared from MP—CH$_2$Cl by the substitution of Cl with 4-hydroxybenzaldehyde in the presence of a base such as sodium hydroxide.

MP—CH$_2$SH, which can be prepared by substituting MP—CH$_2$Cl with thiourea (H$_2$NC(=S)NH$_2$), and the subsequent reaction with an amine such as morpholine.

MP—CH$_2$NH$_2$, which can be prepared by substituting MP—CH$_2$Cl with a phthalimide salt, such as potassium phthalimide, followed by reaction with hydrazine.

MP—CH$_2$NCO, which can be prepared by treating MP—CH$_2$NH$_2$ with phosgene, diphosgene or triphosgene.

MP—CH$_2$NHCONArNCO (wherein Ar is phenylene or methyl phenylene), which can be prepared by reacting MP—CH$_2$NH$_2$ with 1,4 phenylene diisocyanate, 1,3 phenylene diisocyanate, tolylene 2,4-diisocyanate, or tolylene 2,6-diisocyanate.

These funtionalized polymers can be used in a variety of reaction mixtures and solutions to remove impurities containing groups reactive with the polymer as described below.

MP—CH$_2$NHCH$_2$CH$_2$NH$_2$ and MP—CH$_2$NHCH$_2$CH$_2$N (CH$_2$CH$_2$NH$_2$)$_2$ can be used to selectively remove organic acid halides, including sulfonyl halides, organic anhydrides, chloroformates, isocyanates by the formation of a —N—CO—or —N—SO$_2$— bond, aldehydes by forming a —N=C— bond, and acids by forming an ion pair. These polymers can be present, for instance, in reaction mixtures as excess reagents involved in condensation reactions with amines, organic hydrazines, alcohols, and other nucleophiles. These polymers do not bind to the desired products of these reactions, such as amides, substituted hydrazines, esters, imines, and possibly derivatives such as tertiaryamines.

MP—CH$_2$N(R$^1$)R$^2$ (wherein R$^1$ and R$^2$ are ethyl, isopropyl or n-propyl), MP-piperidinomethyl, and MP—morpholinomethyl can be used, for instance, in condensation reactions, such as reactions involving an organic acid chloride with a primary or secondary amine, to scavenge the hydrogen chloride generated. These polymers can also be used as catalysts in such condensation reactions.

MP—CHO and MP—CH$_2$O—Ar—CHO can be used to scavenge hydrazine, primary and secondary amines, hydroxylamine, Grignard reagents, organolithium reagents, and other strong nucleophiles. These polymers do not bind to desired products, such as amides, substituted hydrazines, tertiaryamines, alcohols, and urethanes, since they are not strong nucleophiles with active hydrogen.

MP—CH$_2$SH can preferably be used to scavenge active organic halides, such as benzyl bromide, for example. In general, the polymer should first be converted to a salt form, such as MP—CH$_2$SK, by reaction with a solution of potassium trimethylsilycate in THF, to effectively remove the organic halides from a reaction mixture. MP—CH$_2$NCO and MP—CH$_2$NHCONArNCO can be used to scavenge primary and secondary amines and hydrazines by the formation of a urethane bond. The polymers can selectively remove primary or secondary amines in the presence of alcohols, at a significantly different reaction rate, or tertiary amines (no active hydrogen). These polymers do not react with amides, urethanes, substituted hydrazines, or the expected condensation products from primary and secondary amines, and hydrazines, as the products are not nucleophiles with active hydrogen.

As used in the context of this invention, the term "highly crosslinked" is intended to denote a degree of crosslinking greater than about 8% mole. A polymer which is highly crosslinked will also generally be a "low-swelling" polymer, i.e. a polymer which swells less than about 100% in an organic solvent, such as THF or dichloromethane. The use of a smaller amount of crosslinking agent will generally result in a polymer which swells excessively, i.e., more than about 300%.

By "macroporous" or "porous" is generally meant a porosity ranging from about 0.15 cc/g to about 1.5 cc/g, with an average pore size of at least about 30 Å. The degree of porosity refers to the total pore volume within the solid support. Porosity increases with increasing pore volume.

By "impurity" is meant an unreacted reactant, or excess reactant, a reaction by-product, or a catalyst left after the reaction in a reaction mixture, but not including a desired reaction product.

By "selectively" or "selectively removed" is meant that the functionalized polymer binds to the compound to be removed from the reaction mixture, but does not substantially bind to the desired reaction product. Preferably, the funtionalized polystyrene resin will bind less than about 10% of the desired reaction product, and most preferably less than about 5%.

Although this invention is preferably directed to polystyrene resins, it also encompasses other polymers which have the requisite low-swelling properties and porous structure.

The low-swelling, highly crosslinked, macroporous, funtionalized polymer can be embedded in a film or sheet material in contact with the reaction mixture. For instance, the film or sheet can act as a filter, and the reaction mixture can flow through the film. The impurities in the reaction mixture bind or adhere to the film, while the reaction mixture containing the desired product flows through the film. The product can then be separated from the liquid phase using conventional separation technology. The film can be cleaned of impurities by removing the film from the reaction mixture, and washing it with an aqueous solution or a solvent, as appropriate. The polystyrene resin can also be supported by, or contained within, a porous, insoluble support matrix which is inert to the reaction medium.

The polystyrene resin can also be used in the form of particles or beads. The particles can have any desired shape, and preferably will be sized in the range from about 10 microns to about 400 microns in diameter. The particles can be placed in a container, such as a packed bed, in a chromatography column, in a cartridge, or embedded in a porous film or sheet. The reaction mixture flows through the container and contacts the resin particles where the impurities are retained on the particles. The advantage of using the resin particles in a container is that the effective surface area can be maximized, and the system can be configured for high throughput and automated operation. These features are useful for purifying compounds produced as a result of the combinatorial synthesis of libraries of compounds. The minimal swelling characteristics of the polystyrene resin due to the high degree of crosslinking enables the resin to be used in confined spaces at a much higher loading than conventional polymers.

Further advantages of the highly crosslinked, macroporous polystyrene resin of this invention include the high rate of reaction of the resin with the target impurity in a wide array of solvents, making the performance of the resin essentially independent of the solvent used in the reaction. In addition, the relatively low swelling of the resin reduces the amount of organic solvents used in the reaction, as well as the amount of solvent used for rinsing the product. This, in turn, reduces the volume of reactors, collectors, and associated equipment used to produce a given amount of a targeted product.

The following examples are intended to illustrate the various aspects of the invention without limiting it thereby. As will be appreciated by those skilled in the art, various changes can be made to the procedures, methods and materials employed in the examples without departing from the spirit and scope of the present invention. The present invention is intended to encompass all such variations.

EXAMPLE 1

Preparation of MP—CH$_2$O—Ar—CHO (Ar=1,4 phenylene)

Under argon, 4 grams of sodium hydroxide and 50 ml of dry DMSO were placed in a flask, then 15 grams of hydroxybenzaldehyde was added at room temperature. The mixture was heated to 50° C.–60° C. and kept under stirring at this temperature for about 1 hour until the sodium hydroxide was consumed almost completely. The mixture was cooled to room temperature, and 20 grams of macroporous chloromethyl polystyrene divinylbenzene (average diameter 70 microns, 1.7 mmol/g, 15% crosslinking; obtained from Hecheng Science and Technology, Inc.) was added under nitrogen. The mixture was kept under stirring for 60 hours at 90° C. under argon. An off-white solid (MP—CH$_2$OArCHO) was obtained by filtration and washed subsequently with DMSO, methanol, THF and pentane, then dried in a vacuum oven for 5 hours with mild heating. The structure of the product MP—CH$_2$OArCHO was confirmed by its IR. spectrum, and the degree of functionality was about 1.4 mmol/g, determined by the uptake of phenylhydrazine.

EXAMPLE 2

Preparation of Functionalized Polystyrene MP—CH$_2$NCO 8.5 grams of macroporous aminomethylpolystyrene divinylbenzene (average dimeter 70 microns, 1.4 mmol/g, 15% crosslinking; obtained from Hecheng Science and Technology, Inc.) was suspended in about 20 mL of methylene chloride under argon in a reaction flask and 8.5 mL of tributylamine was added. A solution of triphosgene (1.8 grams, Aldrich) in 10 mL of dichloromethane was added dropwise into the flask at 0° C.–5° C. (cooled with an ice/water bath). Upon completion of the addition, the reaction mixture was kept at room temperature for 5 hours under argon, and an off-white solid (MP—CH$_2$NCO) was obtained upon filtration and washed with dichloromethane, THF and pentane, respectively, and then dried in a vacuum oven at 40° C. for 5 hours. The structure of the product MP—CH$_2$NCO was confirmed by its IR spectrum, and the degree of functionality was 1 mmol/g, determined by the uptake of benzylamine.

EXAMPLE 3
Preparation of Functionalized Polystyrene MP—CH$_2$SH 20 grams of macroporous chloromethylpolystyrene divinylbenzene (average diameter 70 microns, 1.7 mmol/g, 15% crosslinking; obtained from Hecheng Science and Technology, Inc.) was mixed with 8 grams of thiourea (H$_2$NC(=S)NH$_2$, Aldrich) and about 40 mL of triethylene glycol in a reaction flask. The mixture was heated at 110° C. under argon for about 16 hours with magnetic stirring. Upon cooling off, the mixture was filtered, and the solid obtained was washed with methanol. The solid was replaced into a flask, and then mixed with 10 mL of morpholine and 40 mL of methanol. The mixture was refluxed for an extra 3 hours under argon. An off-white solid (MP—CH$_2$SH) was obtained upon filtration and washed with methanol and acetonitrile until the pH of the eluant became 7. The product was dried in a vacuum oven at 50° C. for 4 hours. The mercaptane functionality was confirmed by its IR spectrum, and the degree of functionality was 1.7 mmol/g as determined by elemental analysis.

EXAMPLE 4
Preparation of Functionalized Polystyrene MP—CH$_2$NHCH$_2$CH$_2$NH$_2$ 50 grams of macroporous chloromethylpolystyrene divinylbenzene (average diameter 70 microns, 1.5 mmol/g, 15% crosslinking; obtained from Hecheng Science and Technology, Inc.) was placed in a reaction flask, 130 mL of DMF and 35 mL of ethylene diamine were added. The mixture was kept at 80° C.–90° C. under N$_2$ flow with magnetic stirring for 24 hours. Upon filtration, a white solid was obtained and washed successively with DMF, methanol, methanol/triethylamine (4:1), THF, Hexane. The expected product, MP—CH$_2$NHCH$_2$CH$_2$NH$_2$, was obtained upon drying in a vacuum oven at 70° C.–80° C. for 5 hours. The degree of functionality was 2.2 meq (NH and NH$_2$), determined by elemental analysis, and confirmed by uptake of phenylisocyanate.

EXAMPLE 5
Scavenging of Benzylamine From a Reaction Mixture 0.6 mL of benzylamine in dichloromethane (0.5M) was mixed with 0.4 mL of phenyl isocyante in dichloromethane (0.5M) and extra 0.5 ml dichloromethane in a vial. The mixture was shaken at room temperature for 1 hour. 1 mL MeOH and 0.4 g MP—CH$_2$NCO (1 mmol/g) was added. The mixture was shaken for 2 more hours at room temperature before filtration. GC analysis of the filtrate showed only peaks of phenyl benzyl urethane and internal standards. Upon evaporation of solvents, the phenyl benzyl urethane was obtained in 87% yield.

EXAMPLE 6
Comparison of the Solvent Effect of Macroporous and Gel-type Polymer Scavengers In the following Table, the use of highly cross-linked macroporous polystyrene ("MP") was compared with lightly cross-linked gel-type polystyrene ("Gel") with repect to the uptake of HCl, the uptake of benzylamine, the uptake of toluenesulfonyl hydrazine, and the scavenging capacity of the resin in methanol compared to THF. The resins included amounts of divinylbenzene ("DVB") as shown.

|  | PS-piperidine | | PS-methylisocyanate | | PS-4-benzyloxy-benzaldehyde | |
| --- | --- | --- | --- | --- | --- | --- |
|  | Mp[1] (15% DVB) | Gel[1] (2% DVB) | MP[2] (15% DVB) | Gel[2] (2% DVB) | MP[3] (15% DVB) | Gel[3] (2% DVB) |
| Functional Loading (mmol/g, dry) | 2.0 | 3.0 | 1.3 | 1.5 | 1.4 | 1.3 |
| Swelling in THF | 30% | 400% | 30% | 500% | 30% | 500% |
| Scavenging capacity per volume of the resin (mmol/mL wet in THF) | 0.7 | 0.3 | 0.4 | 0.1 | 0.5 | 0.1 |
| Scavenging capacity factor (in methanol)[4] | 60% | <10% | 67% | 12% | 58% | 15% |

[1]uptake of HCl
[2]uptake of benzylamine
[3]uptake of toluenesulfonyl hydrazide
[4]scavenging capacity of 1 gram resin in methanol compared to that in THF

What is claimed is:

1. A low-swelling, highly crosslinked, macroporous polymer, said polymer having a porosity in the arrange of from about 0.15 cc/g to about 1.5 cc/g, said polymer containing functional groups which are capable of covalently binding to an impurity in a scavenging reaction to selectively remove the impurity from a medium which includes the impurity, a product and at least one solvent selected from THF and dichloromethane, wherein said polymer swells less than 100% in said medium during said scavenging reaction.

2. The polymer of claim 1 which is a copolymer of styrene and divinylbenzene.

3. The polymer of claim 1 wherein the polymer has an average pore size of at least about 30 Å.

4. The polymer of claim 1 which is crosslinked to a degree of at least about 8% mole.

5. The polymer of claim 1 wherein the functional groups are —CH$_2$NHCH$_2$CH$_2$NH$_2$ or —CH$_2$NHCH$_2$CH$_2$N(CH$_2$CH$_2$NH$_2$)$_2$ groups.

6. The polymer of claim 5 which is used to selectively remove organic acid halides, organic anhydrides, chloroformates, isocyanates, aldehydes or acids from a solution or reaction mixture.

7. The polymer of claim 1 wherein the functional groups are —CH$_2$N(R$^1$)R$^2$, wherein R$^1$ and R$^2$ are, independently, ethyl, isopropyl or n-propyl; -piperidinomethyl; or -morpholinomethyl.

8. The polymer of claim 7 which is used to selectively remove hydrogen chloride from a solution or reaction mixture.

9. The polymer of claim 1 wherein the functional groups are —CHO or —CH$_2$O—Ar—CHO, wherein Ar is 1,4 phenylene.

10. The polymer of claim 9 which is used to selectively remove hydrazine, primary and secondary amines, hydroxylamines, Grignard reagents, organolithium reagents, or strong nucleophiles from a solution or reaction mixture.

11. The polymer of claim 1 wherein the functional group is —CH$_2$SH.

12. The polymer of claim 11 which is used to selectively remove organic halides from a solution or reaction mixture.

13. The polymer of claim 1 wherein the functional groups are —CH$_2$NCO or —CH$_2$NHCONArNCO, wherein Ar is phenylene or methyl phenylene.

14. The polymer of claim 13 which is used to selectively remove primary amines, secondary amines, or hydrazine from a solution or reaction mixture.

15. The polymer of claim 1 wherein the impurity is excess reactant.

16. The polymer of claim 1 wherein the impurity is a reaction by-product.

17. A film having the polymer of claim 1 embedded in it.

18. A cartridge containing the polymer of claim 1.

19. A bed containing the polymer of claim 1.

20. A method for removing impurities from a reaction medium comprising contacting the reaction medium with the polymer of claim 1 for a sufficient time to allow the resin to selectively bind to the impurities, the reaction medium containing a product and the impurities, and removing the polymer and impurities from the reaction medium leaving substantially all of the product in the reaction medium.

* * * * *